United States Patent
Takahashi et al.

(10) Patent No.: US 7,361,422 B2
(45) Date of Patent: Apr. 22, 2008

(54) LEADER TAPE AND MAGNETIC TAPE CARTRIDGE USING THE SAME

(75) Inventors: Masatoshi Takahashi, Kanagawa (JP); Mikio Ohno, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 491 days.

(21) Appl. No.: 11/090,069

(22) Filed: Mar. 28, 2005

(65) Prior Publication Data

US 2005/0253010 A1  Nov. 17, 2005

(30) Foreign Application Priority Data

Mar. 26, 2004  (JP) ............... P. 2004-091824

(51) Int. Cl.
*G11B 5/73* (2006.01)
*G11B 5/735* (2006.01)
(52) U.S. Cl. ............... 428/845.5; 428/847.7; 360/90; 360/93; 360/132; 360/134
(58) Field of Classification Search ............ 428/845.5
See application file for complete search history.

(56) References Cited

U.S. PATENT DOCUMENTS 4,798,759 A * 1/1989 Dallman et al. ............ 428/220
5,463,015 A * 10/1995 Chujo et al. ............ 528/308.2
6,896,217 B1 * 5/2005 Ishikawa et al. ............ 242/348

FOREIGN PATENT DOCUMENTS

| JP | 59-132421 A | * | 7/1984 |
| JP | 2001-110164 A | | 4/2001 |

OTHER PUBLICATIONS

JPO Abstract Translation of JP 59-132421 A (Pat-No: JP359132421A).*

* cited by examiner

*Primary Examiner*—Kevin M. Bernatz
(74) *Attorney, Agent, or Firm*—Sughrue Mion, PLLC

(57) ABSTRACT

A leader tape in which an non-magnetic under layer that contains a powder and a binder and a magnetic upper layer are sequentially laminated on at least one side of a support, a center line average roughness (Ra) of a surface of the support is from 30 to 50 nm, and a center line average roughness (Ra) of the multi layer coated surface is larger than that (Ra) of an opposite surface of the support, and the difference is at most 4 nm.

5 Claims, 4 Drawing Sheets

LEADER TAPE AND MAGNETIC TAPE CARTRIDGE USING THE SAME

This application is based on Japanese Patent application JP 2004-091824, filed Mar. 26, 2004, the entire content of which is hereby incorporated by reference. This claim for priority benefit is being filed concurrently with the filing of this application.

BACKGROUND OF THE INVENTION

1. Technical Field of the Invention

The present invention relates to a leader tape, to a magnetic tape cartridge in which the cartridge case rotatably houses a reel with a magnetic tape wound up therearound along with the leader tape bonded thereto.

2. Description of the Related Art

As magnetic tape cartridges used as recording media for external memory devices for computers and others, heretofore known are those of a type where a magnetic tape is wound up around one or more reels rotatably housed in the cartridge case. Since the magnetic tapes are used for data storage for computers and others and since important information is recorded therein, the cartridges are specifically so designed that they are free from a trouble of tape jamming and that a magnetic tape is not carelessly led out of them.

In a single reel-type cartridge, a leader member such as a leader pin or a leader block is fitted to the top end of the magnetic tape, via which the magnetic tape is led out of the cartridge; or a leader tape is bonded thereto, which is formed of a relatively hard plastic material and which has engage holes formed at the top end of the tape. For the cartridge of the type, a drive device is so constructed that the magnetic tape therein could be loaded/unloaded (draw out/wind up) while the leader member or the leader tape top end is held by the holder member on the side of a recording and reproduction device.

In the loading/unloading process as above where the magnetic tape is drawn out toward the side of the magnetic recording and reproduction device and its top end is wound up around the drive reel in the device, the top end of the magnetic tape is contacted with the tape guide and the magnetic head disposed along the tape-running route, while not accurately positioned relative to them, and in that condition, it is pulled and is therefore readily damaged. Accordingly, it is desirable that the top end of the magnetic tape is reinforced.

In addition, the reinforcement is also desirable in order to prevent the leader block level difference occurring in the drive reel from being transferred onto a data-recording magnetic tape to increase the dropouts in the tape. For this, a leader tape having a higher strength than that of a magnetic tape is bonded to the top end of the magnetic tape (e.g., see JP-A-2001-110164).

As a leader tape there is normally used a magnetic tape having a single magnetic layer.

Therefore, when the magnetic tape cartridge loaded in LTO drive is subjected to load/unload cycles, the surface of the leader tape which rubs against LTO drive running system is scratched to give scrapings that are then attached to the running system. The scrapings that have been attached to the running system are then transferred to the surface of the magnetic tape, causing a rise of dropout. It is also disadvantageous in that deformation of the leader tape is transferred to the magnetic tape, raising the error rate.

With the recent tendency for enhancement of capacity of magnetic tape cartridge, the recording density of the magnetic tape cartridge has been raised. Thus, the problem of spacing loss due to transfer of deformation of leader tape to data recording magnetic tape has become more remarkable. It has thus been desired to improve the related art leader tape and data tape.

The leader block mentioned above is so designed that it may be housed in the recess formed in the core of a take-up reel, and when housed therein, a part of the leader block forms a part of the arc face of the core.

This is graphically illustrated. As in FIG. 4A, a leader block 40 is fitted into the recess 42 formed along the radial direction of the core 41, and, for example, in this condition, the end face 40a of the leader block 40 forms a part of the take-up face of the core 41. As illustrated, the end face 40a of the leader block 40 is curved like an arc in correspondence to the outer peripheral face of the core 41, in order to smoothly wind up the magnetic tape MT around it.

However, in such a related art tape drive, the end face 40a may protrude above the core 41, as in FIG. 4B, depending on the dimensional accuracy of the leader block 40 that constitutes a part of the take-up face, and it may form an unacceptable level difference in the take-up face of the core 41.

The level difference may cause folding or deformation of the leader tape LT, and, as in FIG. 4C, the folding and the deformation occur similarly also in the part of the magnetic tape MT which is wound up as the subsequent layers and which is to be a substantial recording region (this may be referred to as "tape deformation transfer"). The tape deformation transfer may cause a problem in that a suitable distance between the tape and the recording/reproducing head could not be ensured in the process of information recording/reproduction, and it may therefore cause recording failure and information loss.

If the time for which the tape is kept wound up around a take-up reel is short, then the tape deformation transfer would not cause the problems as above, but when the magnetic tape MT is kept wound up around the take-up reel and left as such for long, then the magnetic tape MT may often have a regular tape deformation transfer on the surface thereof, at a pitch of nearly the circumference length of the core 41.

SUMMARY OF THE INVENTION

An object of the invention is to provide a leader tape which can suppress the increase in dropouts to be caused by transference of a drive reel or a leader block onto it during long-term storage or high-temperature running, and can prevent the decrease in outputs even when repeating the loading/unloading process; and to provide a magnetic tape cartridge using the leader tape.

The object of the invention can be attained by the following means:

1) A leader tape in which an non-magnetic under layer that contains a powder and a binder and a magnetic upper layer are sequentially laminated on at least one side of a support, a center line average roughness (Ra) of a surface of the support is from 30 to 50 nm, and a center line average roughness (Ra) of the multi layer coated surface is larger than that (Ra) of an opposite surface of the support, and the difference is at most 4 nm.

2) The leader tape of above 1), wherein a thickness of the magnetic upper layer is from 0.1 to 2.0 μm.

3) The leader tape of above 1) or 2), wherein a center line average roughness (Ra) of the magnetic upper layer is from 15 to 40 nm.

4) The leader tape of any of above 1) to 3), wherein a back layer is formed on the opposite face of the support, and surface electrical resistances of the magnetic upper layer and the back layer each is at most $10^{10}$ Ω/sq.

5) A magnetic tape cartridge where a magnetic tape is wound up around one or more reels rotatably housed in a cartridge case, in which a leader tape that is bonded to a top end of the magnetic tape and is let out toward a magnetic recording and reproduction device while leading the magnetic tape is the leader tape of any of above 1) to 4).

The leader tape of the invention is designed to have a specifically-defined surface roughness, and therefore, when it is wound up, a suitable distance may be formed between the faces of the wound tape. The remarkable advantages of the leader tape of the type are that, since the pressure to it may be relieved, a leader block and others are prevented from being transferred to magnetic tapes. Also, The leader tape of the invention is designed to have a specifically-defined difference in Ra between the two sides of the support, and therefore, when repeating the loading/unloading process, the tape deformation is prevented, and the decrease in output is also prevented.

DETAILED DESCRIPTION OF THE INVENTION

Figure 1:
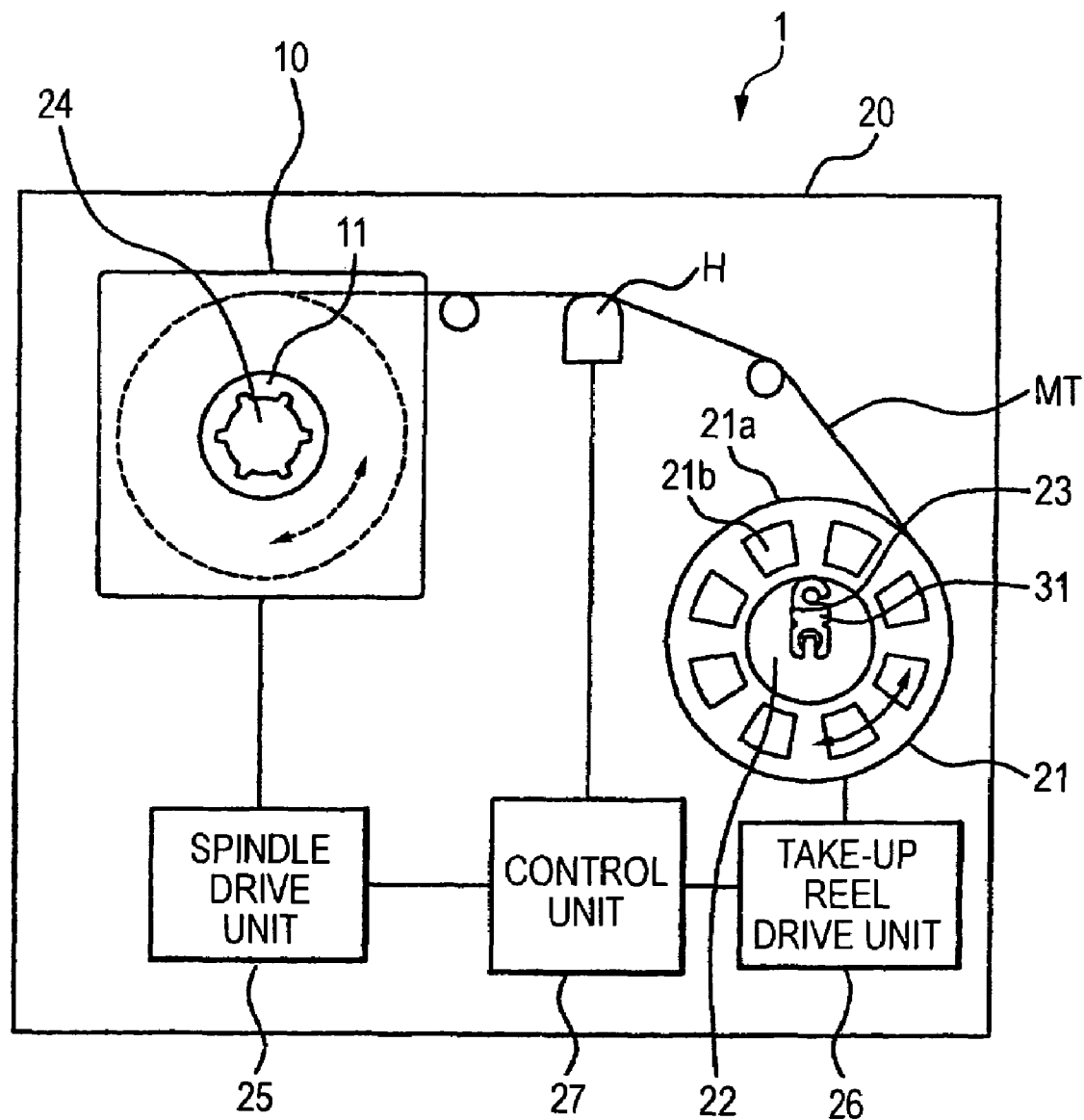
FIG. 1 is a constitutional view conceptually showing a magnetic recording and reproduction device used for the invention.

The center line average roughness (Ra) of the support of the leader tape according to the invention is from 30 to 50 nm.

"Ra" as referred to herein means a value measured with a photointerference surface roughness meter (WYKO's HD-2000) under the condition mentioned below.

Objective lens: 50-power, intermediate lens: 0.5-power, and detection range: 242 μm×184 μm; and after cylindrical correction and inclination correction, Ra is calculated.

In this arrangement, when the leader tape is wound on the reel, a cushioning effect can be exerted to further inhibit deformation transfer.

The leader tape of the invention is preferably used in a magnetic recording/reproducing device having a linear recording density of 100 kfci or more and a difference of from 0 to 16 μm between the recording track width and the reproducing track width. In some detail, since a system having a difference of more than 16 μm between recording track width and reproducing track width has a sufficiently great recording track width as compared with reproducing track width, no rise of dropout occurs even tape deformation causes the occurrence of tape deviation of several micrometers because the head runs over the recording track. However, a magnetic recording/reproducing device having a difference of not greater than 16 μm between recording track width and reproducing track width and hence a great linear recording density is subject to remarkable track dislocation due to tape deformation and thus is more subject to tape deformation transfer. Accordingly, the advantage of the leader tape according to the invention becomes remarkable when a magnetic recording/reproducing device having a great linear magnetic density is used.

Not specifically defined, the magnetic recording and reproduction device may be any one that comprises a magnetic tape cartridge and a magnetic tape drive.

In addition, not also specifically defined, the magnetic tape cartridge may be any one in which a magnetic tape with the leader tape of the invention bonded thereto is wound up around one or more reels rotatably housed in the cartridge case. The invention produces better results when applied to single reel devices.

The leader tape of the invention may be bonded to the top end of a magnetic tape on and from which signals are recorded and reproduced, by attaching a known splicing tape thereto in such a manner that one end of the leader tape is butt-jointed with the top end of the magnetic tape. The other end of the leader tape is provided with an engaging member such as leader pin, and this is used for fixing the leader tape to the drive reel of a magnetic recording and reproduction device.

In the magnetic recording and reproduction of the invention, the magnetic tape cartridge provided with the leader tape of the invention may be used in a magnetic recording and reproduction device, and it enables recording and reproduction under the condition where the line recording density of the magnetic tape to which the leader tape is bonded is at least 100 kfci (preferably at least 200 kfci, more preferably at least 300 kfci) and the difference between the recording track width (preferably at most 20 μm, more preferably at most 15 μm) and the reproduction track width (preferably at most 10 μm, more preferably at most 7 μm) is from 0 to 16 μm (preferably from 0 to 10 μm, more preferably from 2 to 8 μm).

The magnetic recording and reproduction using the leader tape and the magnetic tape cartridge of the invention prevents track shifting and enables stable recording and reproduction even when the recording track width is narrow and the difference between the recording track width and the reproduction track width is small like this.

The recording and reproduction device in which recording and reproduction is attained at the above-mentioned track width is not specifically defined, for which are usable any known magnetic recording and reproduction devices equipped with recording/reproduction heads.

The magnetic head for use in the invention is preferably an inductive head for recording, and an MR head for reproduction.

The invention is described in more detail hereinunder.

[Leader Tape]

The magnetic upper layer and the non-magnetic under layer to be provided on the support are mainly composed of a dispersion of an inorganic particulate material in a binder. The upper layer and the under layer are formed on the surface of the support which is to come in contact with the magnetic head. The average particle size of the inorganic powder to be used in the upper layer and the under layer is from 0.02 to 1 μm, preferably from 0.05 to 0.6 μm. The form of the particles maybe grain, needle, tablet, cube or the like.

The purpose of providing the upper layer and the under layer is to provide functions which are not possessed by the support, e.g., to incorporate abrasive particles in the surface of the support which is to come in contact with the magnetic head and hence render the support capable of cleaning, to incorporate electrically-conductive particles in the support and hence provide the support with antistat effect, to incorporate a magnetic material in the support and hence allow recording of magnetic signal.

Preferably, a two-layer structure obtained by spreading the same non-magnetic layer (under layer) and magnetic layer (upper layer) as used in the data tape is provided on the surface of the support which is to come in contact with the magnetic head while a back coat (back layer) mainly composed of carbon black is provided on the other surface of the support.

The central line average surface roughness Ra of the support of the leader tape is from 30 to 50 nm, preferably from 32 to 45 nm.

In this arrangement, when the leader tape is wound on the reel, a cushioning effect can be exerted to further inhibit deformation transfer. The surface roughness Ra of the support of the leader tape can be easily predetermined by means such as change of calendering conditions.

Further, it is necessary in the invention that Ra of the multi-layer coated surface of the support of the leader tape be greater than that of the other surface of the support and the difference in Ra between the two surfaces be 4 nm or less, preferably 2 nm or less. In this arrangement, when subjected to cycles of load/unload, the leader tape can be prevented from being deformed, making it possible to inhibit output drop.

The aforementioned requirements can be controlled by various methods. These requirements can be easily controlled, e.g., by making the temperature different between the multi-layer coated surface and the other surface of the support during calendering in the process for the production of the support so that the heating conditions during stretching differs from the multi-layer coated surface to the other surface of the support.

The thickness of the upper layer is preferably from 0.1 to 2.0 μm. By predetermining the thickness of the upper layer within this range, an effect of making it difficult for the magnetic layer to receive the shape of the drive reel or the leader block can be exerted.

The central line average surface roughness Ra of the upper layer is measured by the same method as used for Ra of leader tape. The central line average surface roughness Ra of the upper layer is from 15 to 40 nm, preferably from 20 to 30 nm. By predetermining Ra of the upper layer within this range, an effect of relaxing the transfer of the shape of the leader block, etc. to the magnetic tape and inhibiting the deformation of tape after cycles of load/unload can be exerted.

The sum of the thickness of the upper and under layers is preferably from 1.0 to 3.0 μm, more preferably from 1.5 to 2.5 μm. The thickness of the support is preferably from 3 to 17 μm, more preferably from 6 to 15 μm.

The total thickness of the leader tape is preferably from 5 to 20 μm, more preferably from 8 to 18 μm.

Further, the surface electrical resistance of the leader tape (surface electrical resistance of upper layer) and the surface electrical resistance of the back layer which is optionally provided each are preferably $10^{10}$ Ω/sq or less, more preferably $10^9$ Ω/sq or less. In this arrangement, the leader tape can be rendered antistatic to prevent itself from being damaged by electrostatic charge generated on the magnetic head, making it possible to enhance reliability as well as durability against cycles of load/unload of magnetic tape cartridge obtained by assembly of leader tape essentially having a higher strength than magnetic tape on magnetic recording/reproducing device.

As a method of controlling the aforementioned surface electrical resistance to a predetermined range there may be used a method involving the incorporation of an electrically-conductive particulate material in at least one of upper layer, under layer and back layer. For example, carbon black may be incorporated in an amount of from 1 to 20 parts by weight based on 100 parts by weight of the binder in the various layers.

Preferably, the leader tape is a magnetic tape that comprises a non-magnetic layer containing an inorganic powder and a binder as the under layer and a magnetic layer containing a ferromagnetic powder and a binder as the upper layer, and has a back layer formed on the opposite side thereto.

The leader tape that is the magnetic tape as above is described in detail hereinunder.

(Magnetic Layer)

<Binder in Magnetic Layer and Non-Magnetic Layer>

The binder to be used in the magnetic layer and the non-magnetic layer may be any of known thermoplastic resins, thermosetting resins, reactive resins and their mixtures. The thermoplastic resin may have a glass transition point falling between −100 and 150° C., a number-average molecular weight falling between 1000 and 200000, preferably between 10000 and 100000, and a degree of polymerization falling between about 50 and 1000 or so.

Examples of the resin of the type are polymers or copolymers comprising constitutive units of vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal, vinyl ether and the like; and polyurethane resins, and various rubber-type resins. The thermosetting resin and the reactive resin include, for example, phenolic resins, epoxy resins, polyurethane-curable resins, urea resins, melamine resins, alkyd resins, acrylic reactive resins, formaldehyde resins, silicone resins, epoxy-polyamide resins, mixtures of polyester resins and isocyanate prepolymers, mixtures of polyester-polyols and polyisocyanates, and mixtures of polyurethanes and polyisocyanates. These resins are described in detail in Plastic Handbook (published by Asakura Shoten). In addition, any known electron ray-curable resin may be used in each layer. Its examples and its production methods are described in JP-A 62-256219.

The above-mentioned resins may be used herein either singly or as combined. Preferably, at least one selected from polyvinyl chloride resins, vinyl chloride-vinyl acetate copolymers, vinyl chloride-vinyl acetate-vinyl alcohol copolymers and vinyl chloride-vinyl acetate-maleic anhydride copolymers is combined with a polyurethane resin and a polyisocyanate for use in the invention.

The polyurethane resin may have any known structure of polyester-polyurethane, polyether-polyurethane, polyether-polyester-polyurethane, polycarbonate-polyurethane, polyester-polycarbonate-polyurethane, and polycaprolactone-polyurethane. Optionally but preferably, all these binders have at least one polar group selected from COOM, $SO_3M$, $OSO_3M$, $P=O(OM)_2$, $O-P=O(OM)_2$ (in these, M represents a hydrogen atom or an alkali metal base), OH, $N(R)_2$, $N^+(R)_3$ (where R represents a hydrocarbon group), epoxy group, SN and CN, introduced thereinto through copolymerization or addition reaction, in order that the binders may realize further better dispersibility and durability. The amount of the polar group in the binders may be from $10^{-1}$ to $10^{-8}$ mol/g, preferably from $10^{-2}$ to $10^{-6}$ mol/g.

Preferably, the number of the hydroxyl groups to be in the polyurethane resin is from 3 to 20 in one molecule, more preferably from 4 or 5 in one molecule. If the number is smaller than 3 in one molecule, then the reactivity of the resin with a polyisocyanate curing agent may lower and therefore the film strength and the durability may lower. If, however, the number is larger than 20, then the solubility and the dispersibility in solvent of the resin may lower. For controlling the content of the hydroxyl groups in the polyurethane resin, a compound having at least three functional hydroxyl groups may be used in producing the polyurethane resin. Concretely, there are mentioned trimethylolethane, trimethylolpropane, trimellitic anhydride, glycerin, pentaerythritol, hexanetriol; as well as branched polyesters and polyether-esters having 3 or more functional hydroxyl groups that are obtained from a dibasic starting from a polyester-polyol described in JP-B 6-64726 and the compound serving as a glycol component. Preferred for use herein are tri-functional compounds. Tetra- or more multifunctional compounds may readily gel in the reaction step.

The polyisocyanates usable herein are, for example, isocyanates such as tolylene diisocyanate, 4,4'-diphenylmethane diisocyanate (MDI), hexamethylene diisocyanate, xylylene diisocyanate, naphthylene-1,5-diisocyanate, o-toluidine diisocyanate, isophorone diisocyanate, triphenylmethane triisocyanate; products of these isocyanates with polyalcohols; and polyisocyanates produced through condensation of these isocyanates.

The amount of the binder to be in the magnetic layer and the non-magnetic layer may be generally from 5 to 50% by weight, preferably from 10 to 30% by weight of the ferromagnetic powder in the magnetic layer or of the non-magnetic inorganic powder in the non-magnetic layer. When a vinyl chloride-based rein is used, its amount may be from 5 to 30% by weight and when a polyurethane resin is used, its amount may be from 2 to 20% by weight; and the amount of the polyisocyanate to be combined with these is preferably from 2 to 20% by weight. For example, however, when head corrosion may occur owing to minor dechlorination, a combination of only polyurethane and isocyanate may be used.

In the magnetic tape of the type, the amount of the binder, the proportion of the vinyl chloride-based resin in the binder, the amount of the polyurethane resin, the polyisocyanate resin and other resins, the molecular weight and the polar group content of the resins constituting the magnetic layer, as well as various physical properties of the resins mentioned above may be optionally varied between the non-magnetic layer and the magnetic layer, and they are rather optimized in the respective layers. For this, employable are any known techniques relating to multi-layered magnetic layers. For example, when the binder amount is varied in each layer, it is effective to increase the binder amount in the magnetic layer so as to reduce the surface abrasion of the magnetic layer. In order to improve the head touch of the tape to heads, the binder amount in the non-magnetic layer may be increased so as to soften the tape.

<Ferromagnetic Powder>

The ferromagnetic powder to be used in the magnetic layer is preferably a ferromagnetic alloy powder comprising a principal component of α-Fe. The ferromagnetic powder may contain any other atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B, in addition to the predetermined atom. In particular, the powder preferably contains at least one of Al, Si, Ca, Y, Ba, La, Nd, Co, Ni and B, in addition to α-Fe, more preferably at least one of Co, Y and Al.

The ferromagnetic alloy powder may contain a small amount of a hydroxide or an oxide. The ferromagnetic alloy powder for use herein may be any one produced according to any known method. For producing it, for example, the following methods may be mentioned: A method of reducing a composite organic acid salt (principally oxalate) with a reducing vapor such as hydrogen; a method of reducing iron oxide with a reducing vapor such as hydrogen to obtain Fe or Fe—Co particles; a method of pyrolyzing a metal carbonyl compound; a method of adding a reducing agent such as sodium borohydride, hypophosphite or hydrazine to an aqueous solution of a ferromagnetic metal so as to reduce the metal; a method of vaporizing a metal in a low-pressure inert gas to obtain a fine powder of the metal. Thus obtained, the ferromagnetic alloy powder may be subjected to known slow oxidation, for example, according to a method of dipping it in an organic solvent and then drying it; or a method of dipping it in an organic solvent, then introducing oxygen-containing gas into it so as to form an oxide film on the surface of the particles and thereafter drying the particles; or a method of forming an oxide film on the surface of the particles by controlling the partial pressure of the oxygen gas and the inert gas applied thereto, not using an organic solvent. The ferromagnetic alloy powder thus processed in any of these methods may be used herein.

A hexagonal-system ferrite powder may also be used for the ferromagnetic powder to be in the magnetic layer. The hexagonal-system ferrite includes, for example, barium ferrite, strontium ferrite, lead ferrite, calcium ferrite, and their substituted derivatives such as Co-substituted derivatives. Concretely, there are mentioned magnetoplumbite-type barium ferrite and strontium ferrite, spinel-coated magnetoplumbite-type ferrite, partially spinel phase-containing magnetoplumbite-type barium ferrite and strontium ferrite. They may contain any other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb, in addition to the predetermined atoms. In general, substances with elements such as Co—Ti, Co—Ti—Zr, Co—Ti—Zn, Ni—Ti—Zn, Nb—Zn—Co, Sb—Zn—Co or Nb—Zn added thereto may be used.

(Non-Magnetic Layer)

The inorganic powder to be sued in the non-magnetic layer is a non-magnetic powder and may be selected, for example, from inorganic compounds such as metal oxides, metal carbonates, metal sulfates, metal nitrides, metal carbides, metal sulfides. Carbon black may be added to the non-magnetic layer so as to attain known effects of reducing the surface resistivity Rs, reducing the light transmittance and obtaining a desired micro-Vickers hardness. When carbon black is added to the under layer, then the layer may be effective for storing lubricant. Regarding its type, carbon black usable herein may be any of furnace black for rubber, thermal black for rubber, black for color, and acetylene black. Depending on the desired effect thereof, carbon black to be in the under layer must optimize the characteristics mentioned below. When combined in the layer, carbon black may exhibit its effect. In addition, the non-magnetic layer may contain an organic powder depending on its object. Known techniques relating to the magnetic layer may apply to the lubricant, the dispersant, the additive, the solvent and the dispersion method in the non-magnetic layer.

[Additive]

The additives that may be in the magnetic layer and the non-magnetic layer may be those having a head-cleaning effect, a lubricating effect, an antistatic effect, a dispersing effect and a plasticizing effect. Concretely, those described in WO98/35345 may be used herein.

For the lubricant, for example, herein usable are monobasic fatty acids having from 10 to 24 carbon atoms, and their metal salts (e.g., with Li, Na, K, Cu); monofatty acid esters, difatty acid esters or trifatty acid esters of monobasic fatty acids having from 10 to 24 carbon atoms and at least any one of mono, di, tri, tetra, penta or hexa-alcohols having from 2 to 12 carbon atoms; fatty acid esters of monoalkyl ethers of alkylene oxide polymers; and fatty acid amides having from 8 to 22 carbon atoms. The fatty acids and alcohols may contain unsaturated bond and may be branched.

Specific examples of the fatty acids are capric acid, caprylic acid, lauric acid, myristic acid, palmitic acid, stearic acid, behenic acid, oleic acid, elaidic acid, linolic acid, linolenic acid, isostearic acid. The esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, ethylene glycol dioleate.

(Back Layer)

Preferably, the back layer contains carbon black and an inorganic powder. Regarding the binder and various additives to the back layer, referred to are those mentioned hereinabove for the magnetic layer and the non-magnetic layer. The thickness of the back layer is preferably from 0.1 to 1.0 μm, more preferably from 0.4 to 0.6 μm.

(Support)

The support for the magnetic tape is preferably a non-magnetic flexible support. For this, usable are any known films of polyesters such as polyethylene terephthalate, polyethylene naphthalate; as well as polyolefins, cellulose triacetate, polycarbonates, aromatic or aliphatic polyamides, polyimides, polyamidimides, polysulfones, polyaramids, and polybenzoxazole. Of those, preferred are polyethylene terephthalate films and polyimide films. The support may be previously processed for corona discharge treatment, plasma treatment, adhesiveness improvement treatment, thermal treatment or dust removal treatment.

Preferably, the support has an elastic modulus in the machine direction of from 3.5 to 20 GPa, and an elastic modulus in the cross direction of from 3.5 to 20 GPa. More preferably, the elastic modulus of the support is from 4 to 15 in both the machine direction and the cross direction.

(Production Method)

The magnetic layer and the non-magnetic layer may be formed by dissolving or dispersing the above-mentioned components in a solvent to prepare coating compositions for these, and applying the compositions in order on a support (web). The method may be either a wet-on-wet system where the magnetic layer is formed while the underlying non-magnetic layer is still wet, or a wet-on-dry system where the magnetic layer is formed after the underlying non-magnetic layer is dried. Thus coated and dried, the web is suitably oriented, calendered and slit.

[Data-Recording Magnetic Tape]

The data-recording magnetic tape for use herein comprises a magnetic layer formed on a non-magnetic support, and optionally has a backcoat. One preferred embodiment of the tape comprises a non-magnetic under layer and a magnetic upper layer formed on a support having a thickness of from 2 to 9 μm, and has a backcoat formed on the opposite side thereto. The constitutive elements of the magnetic tape are suitable to high-density recording, and the magnetic tapes described in JP-A 2001-250219 and 2002-251710 are preferred examples for use herein.

[Magnetic Tape Cartridge]

The magnetic tape cartridge of the invention is so designed that a magnetic tape is wound up around one or more reels rotatably housed in the cartridge case, and this is characterized in that the leader tape that is bonded to the top end of the magnetic tape and is let out toward a magnetic recording and reproduction device while leading the magnetic tape is the leader tape of the invention.

[Magnetic Recording and Reproduction Device]

The leader tape of the invention especially exhibits its remarkable effect when used in a magnetic recording and reproduction device where the line recording density is at least 100 kfci and the difference between the recording track width and the reproduction track width is from 0 to 16 μm, and its effect is still more remarkable when it is used in a magnetic recording and reproduction device where the difference between the recording track width and the reproduction track width is at most 10 μm.

Preferably, the thickness of the leader tape is at most 5 times that of the magnetic tape, more preferably at most 3 times, even more preferably at most 2 times.

Also preferably, the length of the leader tape is not shorter than the length corresponding to at least 3 windings of the drive reel in the magnetic recording and reproduction device, plus the tape running route length from the mouth of the cartridge case to the drive reel.

Figure 2:
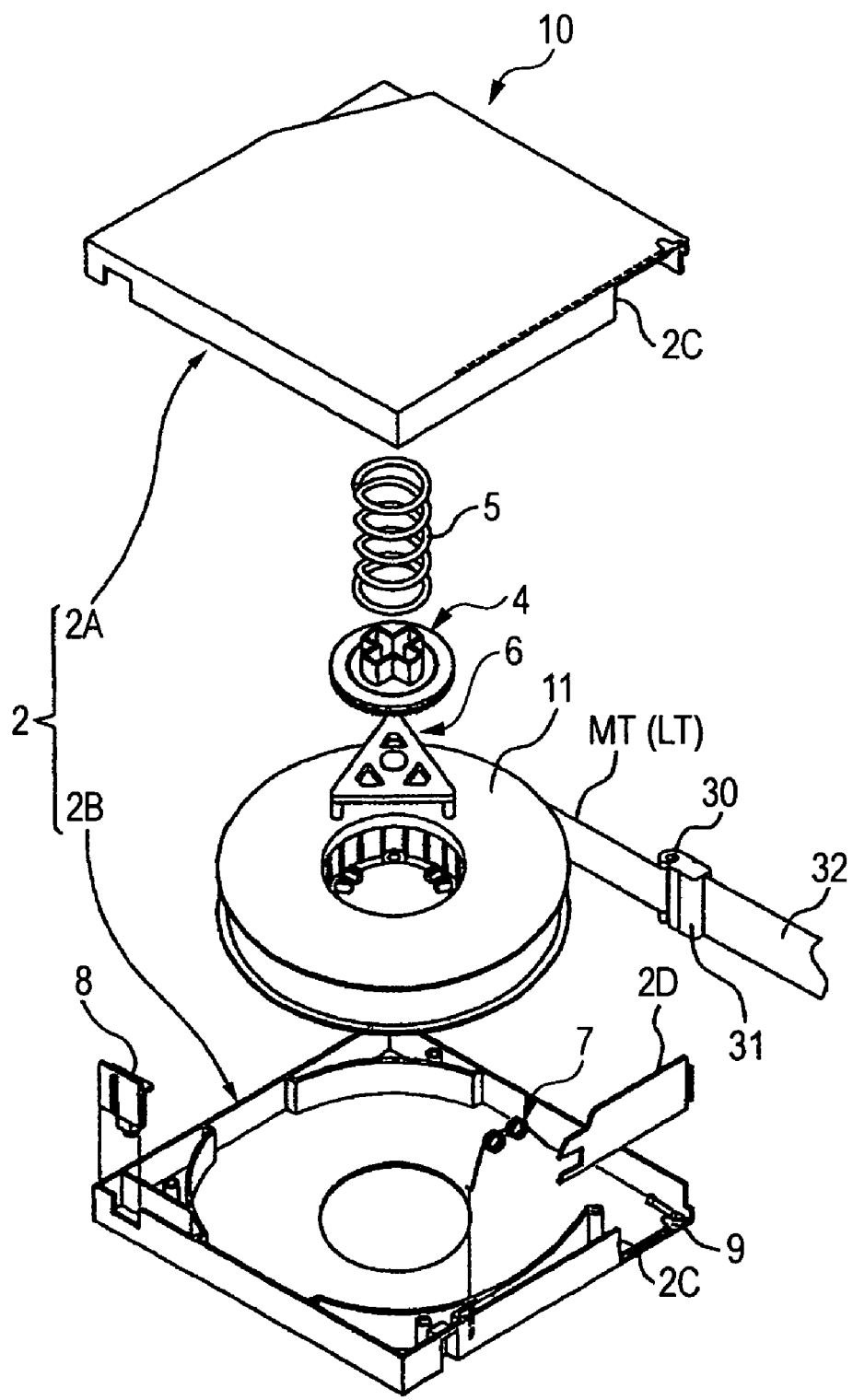
FIG. 2 is a perspective exploded view showing the magnetic tape cartridge used in the magnetic recording and reproduction device.
Figure 3A:
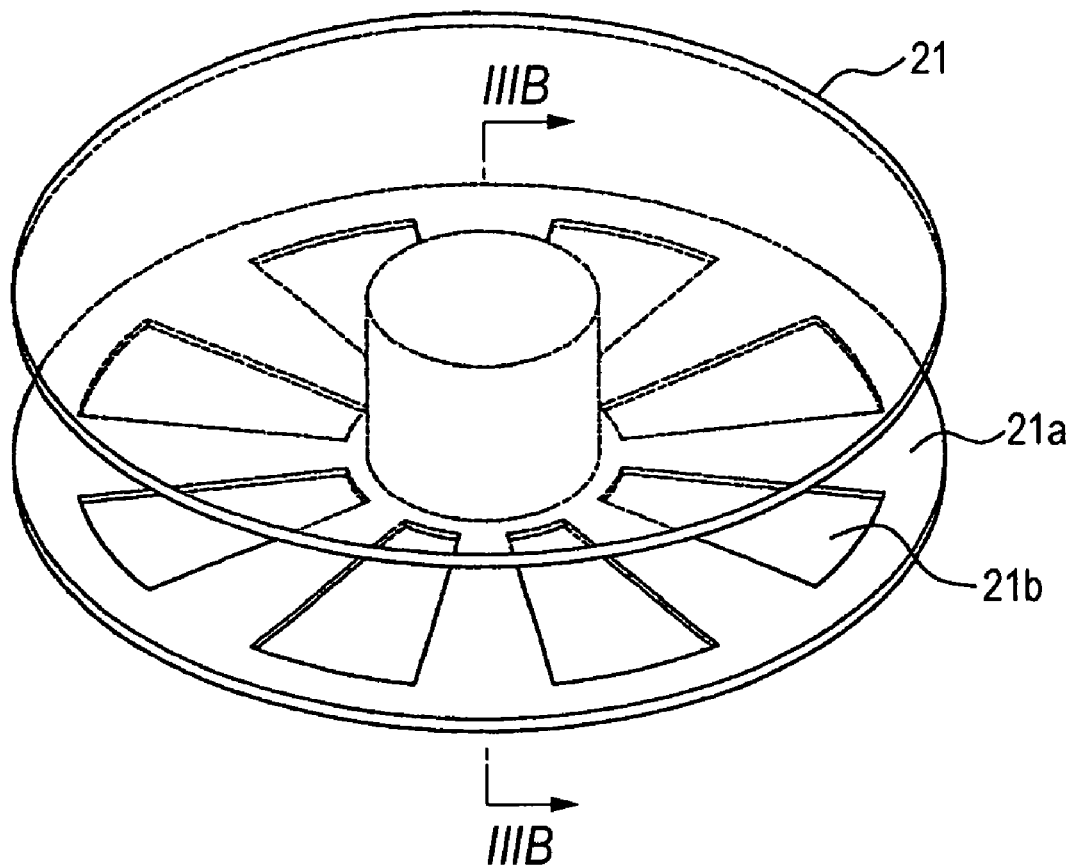
FIG. 3A is a perspective view of the drive reel used in the magnetic recording and reproduction device.
Figure 3B:
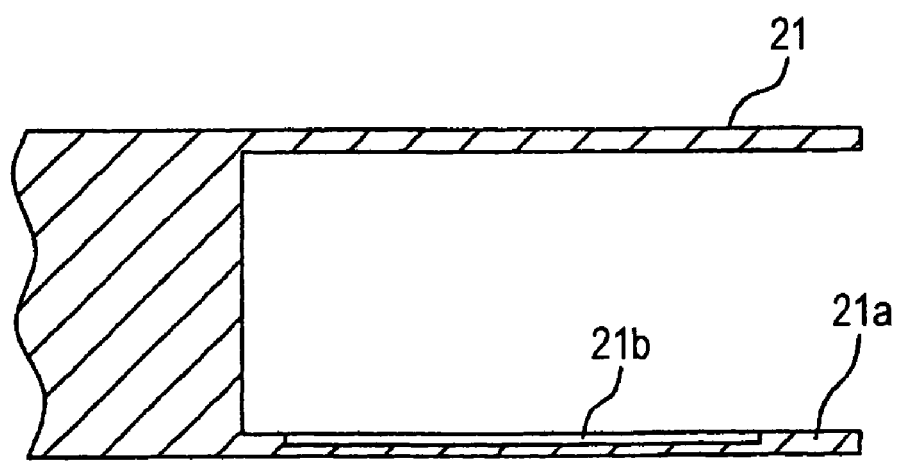
FIG. 3B is a partly-enlarged cross-sectional view of FIG. 3A cut along the IIIB-IIIB line.
Figure 4A:
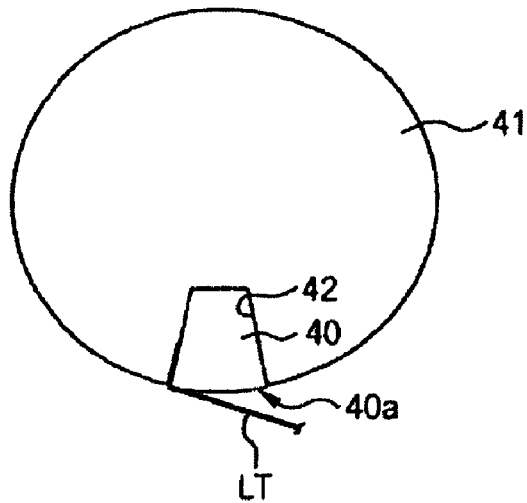
FIGS. 4A to 4C are explanatory views of a related art.
Figure 4B:
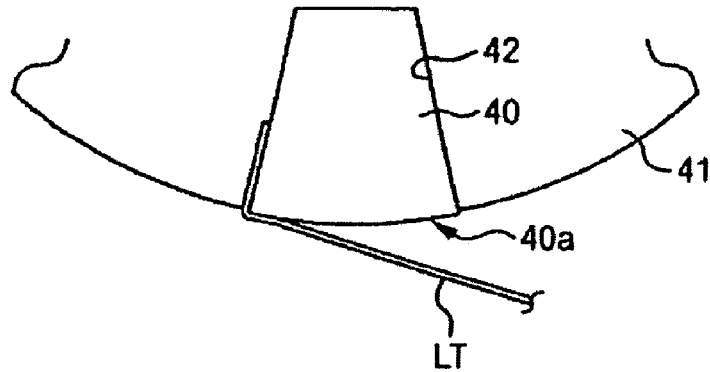
Figure 4C:
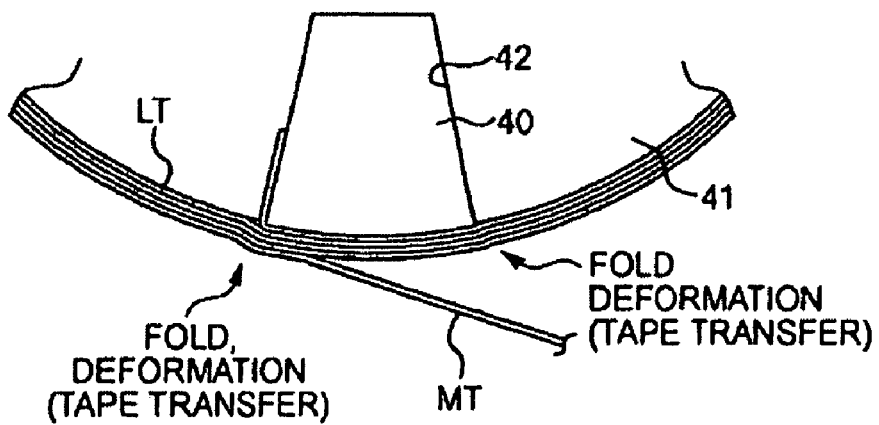

One embodiment of the magnetic recording and reproduction device used for the invention is described in detail with reference to the drawings attached hereto. Of the drawings that are referred to herein, FIG. 1 is a constitutional view conceptually showing one embodiment of the recording and reproduction device of the invention; FIG. 2 is a perspective exploded view showing the magnetic tape cartridge used in the magnetic recording and reproduction device; FIG. 3A is a perspective view of the drive reel (take-up reel) used in the magnetic recording and reproduction device; FIG. 3B is a partly-enlarged cross-sectional view of FIG. 3A cut along the IIIB-IIIB line. The magnetic recording and reproduction device of this embodiment comprises a magnetic tape cartridge with a magnetic tape wound up around one cartridge reel (let-off reel) and a magnetic tape drive (tape drive) loaded with the magnetic tape cartridge, and this is used in the magnetic recording and reproduction method described hereinunder.

As in FIG. 1, the magnetic recording and reproduction device 1 comprises a magnetic tape cartridge 10 and a magnetic tape drive 20. In the magnetic recording and reproduction device 1 of the type, the magnetic tape MT wound up in the magnetic tape cartridge 10 is let off and taken by the drive reel of the magnetic tape drive 20 that serves as a tape receiver, or the magnetic tape MT thus wound up around the drive reel 20 is unwound toward the cartridge reel (let-off reel) 11, whereby information is recorded on the magnetic tape MT or the information thus recorded on the magnetic tape MT is reproduced.

As in FIG. 2, the magnetic tape cartridge 10 satisfies the LTO Standard, and this has a cartridge case 2 divided into a lower half 2B and an upper half 2A. Inside it, the cartridge case 2 houses a single cartridge reel 11 around which a magnetic tape MT is wound up; a reel lock and a compression coil spring 5 for keeping the rotation of the cartridge reel 11 locked; a release pad 6 for releasing the locked condition of the cartridge reel 11; a slide door 2D for opening and closing the magnetic tape let-off mouth 2C formed on one face of the cartridge case 2 to extend to both the lower half 2B and the upper half 2A; a twisted coil spring 7 for forcedly pushing the slide door 2D toward the closing position of the magnetic tape let-off mouth 2C; a miserasure preventing claw 8; and a leader pin rack 9 formed near the magnetic tape let-off mouth 2C. A leader tape LT is bonded to the top end of the magnetic tape MT. The magnetic tape MT in FIG. 2 is the leader tape LT.

The magnetic tape cartridge 10 is loaded in the magnetic tape drive 20, as in FIG. 1, and the leader tape LT is let out by the leader block 31 which will be described hereinunder, and the leader block 31 is fitted into the recess 23 formed in the core 22 of the drive reel 21 in the magnetic tape drive 20. Accordingly, the leader tape TL from the magnetic tape cartridge 10 may be thereby wound up around the core 22 of the drive reel 21.

The leader tape LT and the magnetic tape MT used in the magnetic tape cartridge 10 of this embodiment are described in detail.

The leader tape LT is formed long, and in this embodiment, its length is enough to correspond to at least 3 windings around the core 22 of the drive reel 21 in the magnetic tape drive 20. The leader tape LT preferably has a length of from 0.5 to 5.0 m, more preferably 0.9 m.

Next described is the magnetic tape drive 20.

The magnetic tape drive 20 comprises a spindle 24, a spindle drive unit 25 for driving the spindle 24, a magnetic head H, a drive reel 21, a take-up reel drive unit 26 for driving the drive reel 21, and a control unit 27, as in FIG. 1.

In addition, the magnetic tape drive 20 is provided with a leader block 31 capable of engaging with the leader pin (see FIG. 2) disposed at the top end of the leader tape LT from the magnetic tape cartridge 10, and the leader block 31 is moved toward the magnetic tape cartridge 10 by a lead-off mechanism (not shown) including a lead-off guide 32 or the like.

When data are recorded/reproduced on/from the magnetic tape MT, the spindle drive unit 25 and the take-up reel drive unit 26 act to rotate and drive the spindle 24 and the drive reel 21, whereby the magnetic tape MT is moved.

The drive reel 21 is so designed that the upper face of the lower flange 21a has radial grooves 21b formed at regular intervals, as in FIGS. 3A and 3B. The grooves 21b function as discharge paths for discharging the air that may enter the drive reel 21 while the magnetic tape MT is wound up around it.

The action of the magnetic tape drive 20 is described.

When the magnetic tape cartridge 10 is set in the magnetic tape drive 20 as in FIG. 1, then the lead-off guide 32 (see FIG. 2) acts to lead out the leader pin 30 and move it to the drive reel 21 via the magnetic head H, and the leader block 31 is thereby fitted into the recess 23 of the core 22 of the drive reel 21. The recess 23 is provided with an anchor part (not shown) that engages with the leader block 31 to thereby prevent the leader block 31 from jumping out of the recess 23.

With that, the spindle drive unit 25 and the take-up reel drive unit 26 are driven while controlled by the control unit 27, and the spindle 24 and the drive reel 21 are rotated in the same direction so that the leader tape LT and the magnetic tape MT are moved toward the drive reel 21 from the cartridge reel 11. Accordingly, the leader tape LT is wound up around the drive reel 21, and then the magnetic tape MT is wound up around the drive reel 21, whereupon information is recorded on the magnetic tape MT or the information recorded on the magnetic tape MT is reproduced by the action of the magnetic head H.

When the magnetic tape MT is rewound around the cartridge reel 11, the spindle 24 and the drive reel 21 are rotated and driven in the direction opposite to the above, whereby the magnetic tape MT is moved toward the cartridge reel 11. Also in the rewinding operation, information recording on the magnetic tape MT or information reproduction from the magnetic tape MT may be attained by the magnetic head H.

In the magnetic recording and reproduction device 1 of the type, the magnetic tape MT is generally kept wound in the magnetic cartridge 10 in many cases, but in some use embodiment, it may be kept wound up around the drive reel 21 in the magnetic tape drive 20 for a long period of time. In some such use embodiment, the usefulness of preventing tape deformation transfer is extremely great, and the leader tape and the magnetic tape cartridge employed in the magnetic recording and reproduction device 1 of this embodiment and the magnetic recording and reproduction method for the device 1 are favorable for the case. Specifically, when the magnetic tape MT is wound up around the drive reel 21 of the magnetic tape drive 20 from the magnetic tape cartridge 10, the leader block 31 that acts to lead the magnetic tape MT out of the magnetic tape cartridge 10 is fitted into the core 22 of the drive reel 21, but depending on the dimensional accuracy of the leader block 31, the leader block 31 may protrude (as level difference) from the edge face of the core 22. In such a case, when a related art leader tape is wound up around the drive reel 21, then the level difference may be transferred to the magnetic tape MT and the distance between the magnetic head and the magnetic layer maybe enlarged, therefore causing some problems of recording failure and information loss in the magnetic tape MT.

Contrary to this, in the magnetic recording and reproduction method of the invention, the level difference can be well absorbed by the leader tape LT, and even when the magnetic recording and reproduction device 1 is used, in which the line recording density is at least 100 kfci and the difference between the recording track width and the reproduction track width is from 0 to 16 µm, the method of the invention enjoys the advantage in that it can evade the problems of recording failure and information loss in the magnetic tape MT.

EXAMPLES

The invention is described in detail with reference to the following Examples, to which, however, the invention should not be limited.

Example 1

In the Examples, "part" is by weight.

Formation of Leader Tape:

<Preparation of Coating Compositions>

Coating Composition for upper layer:

| | |
|---|---|
| Ferromagnetic metal powder | 100 parts |
| coercive force Hc: 128 kA/m (1600 Oe) | |
| specific surface area by BET method: 53 m²/g | |
| crystallite size: 160 angstroms | |
| saturation magnetization σs: 130 A · m²/kg | |
| mean major axis length: 130 nm | |

-continued

| | |
|---|---|
| mean acicular ratio: 6.5 | |
| pH: 9.3 | |
| Co/Fe: 5 atm. % | |
| Al/Fe: 7 atm. % | |
| Y/Fe: 2 atm. % | |
| soluble Na: 5 ppm | |
| soluble Ca: 1 ppm | |
| soluble Fe: 1 ppm | |
| Vinyl chloride-based copolymer (Nippon Zeon's MR-100) (—SO$_3$Na content: 5 × 10$^{-6}$ eq/g, degree of polymerization: 350), epoxy content: 3.5 weight % as monomer unit) | 10 parts |
| Polyester-polyurethane resin (neopentylglycol/caprolactone polyol/MDI = 0.9/2.6/1 by weight, —SO$_3$Na content: 1 × 10$^{-4}$ eq/g) | 2.5 parts |
| α-alumina (mean particle size: 0.3 μm) | 10 parts |
| Carbon black (mean particle size: 0.10 μm) | 1 part |
| Butyl stearate | 1.5 parts |
| Stearic acid | 0.5 parts |
| Methyl ethyl ketone | 150 parts |
| Cyclohexanone | 50 parts |
| Toluene | 40 parts |
| Coating Composition for under layer: | |
| Non-magnetic powder, TiO$_2$ | 90 parts |
| specific surface area by BET method: 45 m$^2$/g | |
| mean grain diameter: 0.1 μm | |
| pH: 6.5 | |
| soluble Na: 5 ppm | |
| soluble Ca: 1 ppm | |
| Carbon black | 10 parts |
| mean primary particle size: 16 nm | |
| DBP oil absorption: 80 ml/100 g | |
| pH: 8.0 | |
| specific surface area by BET method: 250 m$^2$/g | |
| Vinyl chloride-based polymer | 12 parts |
| Nippon Zeon's MR-100 | |
| Polyester-polyurethane resin (neopentylglycol/caprolactone polyol/MDI = 0.9/2.6/1 by weight, —SO$_3$Na content: 1 × 10$^{-4}$ eq/g) | 5 parts |
| Butyl stearate | 1.06 parts |
| Stearic acid | 1.18 parts |
| Methyl ethyl ketone | 150 parts |
| Cyclohexanone | 50 parts |
| Toluene | 40 parts |

The constitutive components of the upper layer coating composition and those of the under layer coating composition were separately kneaded in a continuous kneader and then dispersed by the use of a sand mill. 5 parts of polyisocyanate (Nippon Polyurethane's Coronate L) was added to each of the resulting dispersions, and 40 parts of methyl ethyl ketone was added to each of them. The dispersions were filtered through a filter membrane having a mean pore size of 1 μm, and the upper layer coating composition and the under layer coating composition were thus obtained.

Coating Composition for Back Layer Formation:

| | |
|---|---|
| Particulate carbon black (Cabot's BP-800, mean particle size: 17 nm) | 100 parts |
| Coarse carbon black (Carncalp's thermal black, mean particle size: 270 nm) | 10 parts |
| α-alumina (hard inorganic powder) (mean particle size: 200 nm, Mohs' hardness: 9) | 5 parts |
| Nitrocellulose resin | 140 parts |
| Polyurethane resin | 15 parts |
| Polyester resin | 5 parts |
| Dispersant: copper oleate | 5 parts |
| Copper phthalocyanine | 5 parts |
| Barium sulfate (precipitating) (BF-1, mean particle size: 50 nm, Mohs' hardness: 3, by Sakai Kagaku Kogyo) | 5 parts |

-continued

| | |
|---|---|
| Methyl ethyl ketone | 1200 parts |
| Butyl acetate | 300 parts |
| Toluene | 600 parts |

The constitutive components of the back layer coating composition were kneaded in a continuous kneader and then dispersed by the use of a sandmill. 40 parts of polyisocyanate (Nippon Polyurethane's Coronate L) and 1000 parts of methyl ethyl ketone were added to the resulting dispersion, and this was filtered through a filter membrane having a mean pore size of 1 μm to prepare a back layer coating composition.

Formation of Leader Tape:

The upper layer coating composition and the under layer coating composition thus obtained in the above were applied at the same time to a long-size polyethylene terephthalate (PET) support (thickness: 14.0 μm, Young's modulus in MD direction: 500 kg/mm$^2$ (4.9 GPa), Young's modulus in TD direction: 500 kg/mm$^2$ (4.9 GPa), center line average roughness Ra of the upper layer-coated face (cutoff value: 0.25 mm): 38 nm, Ra of the back layer-coated face: 36 nm) in a mode of simultaneous coating to form an upper layer and a under layer so that they could have a dry thickness of 0.8 μm and 1.8 μm, respectively. Next, while the upper layer was still wet, this was oriented by the use of a cobalt magnet having a magnetic force of 300 mT and a solenoid having a magnetic force of 150 mT. Next, this was dried, and the upper layer was thus formed.

Next, on the other face of the support (opposite side to the upper layer), the back layer coating composition was applied to form a back layer so that it could have a dry thickness of 0.5 μm. Then, this was dried and the back layer was formed. Accordingly, a leader tape roll was thus obtained, having the upper layer on one face of the support and having the back layer on the other face thereof.

The web was allowed to run through a 110° C. heat treatment zone for 5 seconds under a tension of 1.5 Kg/m (14.7 N/m) so that it was subjected to heat treatment.

The roll of leader tape thus heat-treated was passed through a 7-stage calendering machine comprising a hot metal roll and an elastic roll having a core metal covered by a thermosetting resin (temperature: 90° C.; linear pressure: 300 Kg/cm (294 kN/m); speed: 300 m/min) so that it was calendered, and then wound under a tension of 5 Kg/m (49 N/m). The hot metal roll was made of chrome-molybdenum steel plated with hard chromium. The surface roughness Ra of the hot metal roll was 0.005 μm (cutoff value: 0.25 mm). The thermosetting resin constituting the elastic roll was obtained by reacting a work of bis (2-oxoline) with an aromatic diamine and an epoxy compound.

The roll thus obtained was then subjected to heat treatment at 50° C. for 48 hours. Subsequently, the roll was slit into a size of ½ inch wide, and then passed through a solenoid having a magnetic flux density of 300 mT to undergo demagnetization.

[Preparation of Magnetic Tape Cartridge]

The ½ inch wide magnetic tape thus obtained was connected as a leader tape to a commercially available LTO tape to prepare a magnetic tape cartridge. The magnetic tape was wound over a length of 580 m.

Example 2

A magnetic tape cartridge according to the invention was prepared in the same manner as in Example 1 except that as the support to be used in the preparation of leader tape there was used a PET support having a center line average roughness Ra of multi-layer coated face of 31 nm and an Ra of the opposite face of 30 nm.

Example 3

A magnetic tape cartridge according to the invention was prepared in the same manner as in Example 1 except that as the support to be used in the preparation of leader tape there was used a PET support having a center line average roughness Ra of multi-layer coated face of 49 nm and an Ra of the opposite face of 45 nm.

Comparative Example 1

A magnetic tape cartridge was prepared in the same manner as in Example 1 except that as the support to be used in the preparation of leader tape there was used a PET support having a center line average roughness Ra of multi-layer coated face of 8 nm and an Ra of the opposite face of 8 nm.

Comparative Example 2

A magnetic tape cartridge was prepared in the same manner as in Example 1 except that as the support to be used in the preparation of leader tape there was used a PET support having a center line average roughness Ra of multi-layer coated face of 30 nm and an Ra of the opposite face of 38 nm.

Comparative Example 3

A magnetic tape cartridge was prepared in the same manner as in Example 1 except that as the support to be used in the preparation of leader tape there was used a PET support having a center line average roughness Ra of multi-layer coated face of 25 nm and an Ra of the opposite face of 28 nm.

Comparative Example 4

A magnetic tape cartridge was prepared in the same manner as in Example 1 except that as the support to be used in the preparation of leader tape there was used a PET support having a center line average roughness Ra of multi-layer coated face of 54 nm and an Ra of the opposite face of 50 nm.

Comparative Example 5

A magnetic tape cartridge was prepared in the same manner as in Example 1 except that as the support to be used in the preparation of leader tape there was used a PET support having a center line average roughness Ra of multi-layer coated face of 40 nm and an Ra of the opposite face of 32 nm.

Comparative Example 6

A magnetic tape cartridge was prepared in the same manner as in Example 1 except that only the upper layer coating compound was spread over the support to a thickness of 2.6 μm.

[Evaluation of Magnetic Tape Cartridge]

[Tape Deformation]

The magnetic tape cartridge thus obtained was subjected to 10,000 cycles of load/unload using LTO remodeled drive at a temperature of 23±2° C. and a relative humidity of from 40 to 60% RH. Thereafter, the deformation of the magnetic tape was determined by a three-score method.

3 points: No deformation 2 points: A little deformation 1 point: Obvious deformation

[Output Decrease]

At first, whole length of the magnetic tape was made to run one cycle by using the LTO remodeled drive to record the signal and measure the reproduction output. Then, the magnetic tape was subjected to 10,000 cycles of load/unload, and the whole length of the magnetic tape was again made to run one cycle to measure the reproduction output. The difference in the reproduction outputs of 10 m of the magnetic tape to which the leader tape was bonded, in which the signal was recorded, between the beginning state and that of after the load/unload was defined as the output decrease.

The results are set forth in Table 1 below.

TABLE 1

| | Surface roughness of support Ra (nm) | | Surface electrical resistance Rs (Ω/sq) | | Surface roughness of upper layer Ra (nm) | Deformation of leader tape | Output decrease (dB) |
|---|---|---|---|---|---|---|---|
| | multi-layer side | opposite side | upper layer | back layer | | | |
| Example 1 | 38 | 36 | $5 \times 10^8$ | $8 \times 10^7$ | 24 | 3 | −1 |
| Example 2 | 31 | 30 | $5 \times 10^8$ | $8 \times 10^7$ | 18 | 2 | −2 |
| Example 3 | 49 | 45 | $5 \times 10^8$ | $8 \times 10^7$ | 38 | 3 | 0 |
| Comparative Example 1 | 8 | 8 | $5 \times 10^8$ | $8 \times 10^7$ | 5 | 1 | −6 |
| Comparative Example 2 | 30 | 38 | $5 \times 10^8$ | $8 \times 10^7$ | 18 | 1 | −5 |
| Comparative Example 3 | 25 | 28 | $5 \times 10^8$ | $8 \times 10^7$ | 12 | 1 | −5 |
| Comparative Example 4 | 54 | 50 | $5 \times 10^8$ | $8 \times 10^7$ | 45 | 1 | −4 |

TABLE 1-continued

|  | Surface roughness of support Ra (nm) | | Surface electrical resistance Rs (Ω/sq) | | Surface roughness of | Deformation | Output |
| --- | --- | --- | --- | --- | --- | --- | --- |
|  | multi-layer side | opposite side | upper layer | back layer | upper layer Ra (nm) | of leader tape | decrease (dB) |
| Comparative Example 5 | 40 | 32 | $5 \times 10^8$ | $8 \times 10^7$ | 30 | 1 | −4 |
| Comparative Example 6 | 38 | 36 | $5 \times 10^8$ | $8 \times 10^7$ | 20 | 1 | −4 |

As can be seen in the aforementioned results, the inventive examples show a less deformation of magnetic tape and the output decrease is suppressed compared with the comparative examples.

What is claimed is:

1. A leader tape comprising:
   a support; and
   a multi layer comprising an non-magnetic under layer that contains a powder and a binder; and a magnetic upper layer in this order on a first surface of the support, wherein
   the first surface has a first center line average roughness of from 30 to 50 nm,
   a second surface of the support which it opposite side to the first surface has a second center line average roughness of from 30 to 50 nm, and
   the first center line average roughness is larger than the second center line average roughness and a difference thereof is 4 nm or less.

2. The leader tape according to claim 1, wherein the magnetic upper layer has a thickness of from 0.1 to 2.0 μm.

3. The leader tape according to claim 1, wherein the magnetic upper layer has a surface having a center line average roughness of from 15 to 40 nm.

4. The leader tape according to claim 1, wherein
   the leader tape further comprises a back layer on the second surface of the support, and
   the magnetic upper layer and the back layer each has a surface electrical resistance of 1010 Ω/sq or less.

5. A magnetic tape cartridge where a magnetic tape is wound up around one or more reels rotatably housed in a cartridge case, in which a leader tape that is bonded to a top end of the magnetic tape and is let out toward a magnetic recording and reproduction device while leading the magnetic tape is the leader tape of claim 1.

* * * * *